(12) United States Patent
Ramakrishnan et al.

(10) Patent No.: US 9,470,551 B2
(45) Date of Patent: Oct. 18, 2016

(54) METHOD FOR UNSUPERVISED NON-INTRUSIVE LOAD MONITORING

(75) Inventors: Naveen Ramakrishnan, Wexford, PA (US); Diego Benitez, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 1337 days.

(21) Appl. No.: 13/331,822

(22) Filed: Dec. 20, 2011

(65) Prior Publication Data

US 2013/0158908 A1  Jun. 20, 2013

(51) Int. Cl.
*G01D 4/00* (2006.01)

(52) U.S. Cl.
CPC .......... *G01D 4/002* (2013.01); *Y02B 70/3266* (2013.01); *Y02B 90/241* (2013.01); *Y02B 90/245* (2013.01); *Y04S 20/242* (2013.01); *Y04S 20/32* (2013.01); *Y04S 20/40* (2013.01)

(58) Field of Classification Search
CPC ...................................................... G01D 4/002
USPC ......................................................... 702/60
See application file for complete search history.

(56) References Cited

U.S. PATENT DOCUMENTS

| | | |
|---|---|---|
| 4,858,141 A | 8/1989 | Hart et al. |
| 5,337,013 A | 8/1994 | Langer et al. |
| 5,340,964 A | 8/1994 | Galloway et al. |
| 5,483,153 A | 1/1996 | Leeb et al. |
| 5,696,695 A | 12/1997 | Ehlers et al. |
| 5,706,402 A | 1/1998 | Bell |
| 5,717,325 A | 2/1998 | Leeb et al. |
| 5,963,457 A | 10/1999 | Kanoi et al. |
| D458,864 S | 6/2002 | Keeler et al. |
| 6,965,470 B2 | 11/2005 | So |
| 6,983,264 B2 | 1/2006 | Shimizu |
| 6,993,417 B2 | 1/2006 | Osann, Jr. |
| 7,043,380 B2 | 5/2006 | Rodenberg, III et al. |
| 7,184,992 B1 | 2/2007 | Polyak et al. |
| 7,315,769 B2 | 1/2008 | Balan et al. |
| 7,685,079 B2 | 3/2010 | Watford et al. |
| 7,693,670 B2 | 4/2010 | Durling et al. |
| 7,885,917 B2 | 2/2011 | Kuhns et al. |
| 2004/0225648 A1 | 11/2004 | Ransom et al. |

(Continued)

FOREIGN PATENT DOCUMENTS

| | | |
|---|---|---|
| EP | 1136829 | 9/2001 |
| EP | 2026299 | 2/2009 |

OTHER PUBLICATIONS

International Search Report and Written Opinion in corresponding PCT application (i.e., PCT/US2012/070393), completed Apr. 29, 2013 (9 pages).

(Continued)

*Primary Examiner* — Bryan Bui
(74) *Attorney, Agent, or Firm* — Maginot Moore & Beck LLP (57) ABSTRACT

A method distinguishes electrical signals corresponding to an activation or deactivation of a single electrical power consuming device from an electrical signal that supplies electricity to multiple electrical power consuming devices has been developed. The method includes generating signatures corresponding to activation and deactivation of a plurality of electrical devices from a transformation of an electrical power signal using sparse deconvolution to cluster and then identify the activation and deactivation of one of the plurality of electrical devices.

17 Claims, 4 Drawing Sheets

(56) References Cited

U.S. PATENT DOCUMENTS

| | | |
|---|---|---|
| 2007/0018852 A1 | 1/2007 | Seitz |
| 2007/0155349 A1 | 7/2007 | Nelson et al. |
| 2009/0319207 A1 | 12/2009 | Koch |
| 2010/0070217 A1 | 3/2010 | Shimada et al. |
| 2010/0076615 A1 | 3/2010 | Daniel et al. |
| 2010/0280978 A1* | 11/2010 | Shimada ............ H02J 13/0079 706/12 |
| 2010/0305773 A1 | 12/2010 | Cohen |
| 2010/0305889 A1 | 12/2010 | Tomlinson, Jr. et al. |
| 2011/0004421 A1 | 1/2011 | Rosewell et al. |
| 2011/0025519 A1 | 2/2011 | Donaldson et al. |
| 2011/0046904 A1 | 2/2011 | Souilmi |
| 2011/0101957 A1 | 5/2011 | Boufounos |
| 2011/0109306 A1 | 5/2011 | Leeb et al. |
| 2011/0144819 A1 | 6/2011 | Andrews et al. |
| 2011/0153246 A1 | 6/2011 | Donaldson et al. |
| 2011/0288793 A1 | 11/2011 | Sanchez-Loureda et al. |
| 2015/0137990 A1* | 5/2015 | Riche ..................... G01D 4/00 340/870.03 |

OTHER PUBLICATIONS

Hart, "Nonintrusive Appliance Load Monitoring", Proceedings of the IEEE; Dec. 1, 1992; pp. 1870-1891; vol. 80, No. 12; New York, US (22 pages).

Zeifman et al., "Nonintrusive Appliance Load Monitoring: Review and Outlook", IEEE Transactions on Consumer Electronics; Feb. 2011; pp. 76-84; vol. 57, No. 1; New York, US (9 pages).

Bach et al, "Optimization with Sparisity-Inducing Penalties," Paper, SIERRA Project Team, Aug. 4, 2011, (75 pages).

Bergman et al., "Distributed Non-Intrusive Load Monitoring," Paper, (8 pages).

Edkanadham et al, "Sparse Decomposition of Transformation-Invariant Signals With Continuous Basis Pursuit," Presented/published in: Proc Int'l Conf Acoustics Speech Signal Processing (ICASSP), Prague, Czech Republic, May 2011, c IEEE Sig Proc Society, (4 pages).

Baranski et al., "Detecting Patterns of Appliances from Total Load Data Using a Dynamic Programming Approach," Proceedings of the Fourth IEEE International Conference on Data Mining (ICDM'04), 2004, Germany, (4 pages).

Proper et al., "Field Demonstration of a Real-Time Non-Intrusive Monitoring System for Condition-Based Maintenance," USA, 2009, (12 pages).

Zeifman et al., "Non-Intrusive Appliance Load Monitoring (NIALM): Review and Outlook," Fraunhofer Center for Sustainable Energy Systems, Jan. 10, 2011, International Conference on Consumer Electronics, Las Vegas, (27 pages).

Ayers et al., "Iterative blind deconvolution method and its applications," Optics Letters, Jul. 1988, pp. 547-549, vol. 13, No. 7, United Kingdom (3 pages).

Paris, "A Framework for Non-Intrusive Load Monitoring and Diagnostics," Thesis, Feb. 2006, Massachusetts Institute of Technology, USA (260 pages).

Cox, "A Field-Based Approach to Non-Intrusive Load Monitoring," Paper, 12 pages.

Goncalves et al, "Unsupervised disaggregation of appliances using aggregated consumption data," SustKDD 2011, Aug. 2011, San Diego, CA, USA (6 pages).

Kvedalen et al., "Signal processing using the Teager Energy Operator and other nonlinear operators," Thesis, May 2003, University of Oslo Department of Informatics, Norway (121 pages).

* cited by examiner

METHOD FOR UNSUPERVISED NON-INTRUSIVE LOAD MONITORING

TECHNICAL FIELD

This document relates generally to the field of electrical power monitoring, and, more particularly, to methods for electrical power monitoring of multiple devices that are connected to a common electrical power source.

BACKGROUND

Precise measurement of electrical power consumption is a topic of great interest in any industry or technology that consumes electrical power. Due to the cost of purchasing electrical energy and the environmental impact of various forms of electrical power generation, many businesses and individuals have a strong interest in monitoring electrical power usage. In one simple configuration, a single electrical power meter measures the total electrical power consumption of a single site such as an entire house or building. One problem with the simple configuration is that the single power meter does not directly distinguish the individual devices on the site that consume electricity. Thus, extra information is required to determine the activity and power consumption characteristics of different electrical devices in the site to identify the contributions of individual devices to the total power consumption at the site. In another configuration, multiple power meters can be connected to monitor individual devices in a site. While the approach of using multiple power meters enables monitoring of individual devices, the added cost and complexity of installing and operating the power meters presents an obstacle to efficient measurement of electrical power consumption.

One method of power monitoring that can measure the power consumption of individual devices without requiring separate electrical power meter for each device in a site is referred to as non-intrusive load monitoring (NILM). A NILM system identifies individual electrical devices that consume power from a single electrical source, such as a main electrical line that supplies electrical power to a building. In a NILM system, a single electrical power monitoring device generates information about the power consumption of multiple devices over time, and the NILM system can identify times at which an individual device is activated, deactivated, and the total power consumption of the individual device while activated.

In order to identify each individual device that draws electrical power from a single electrical line, individual electrical waveforms for each device are generated and stored in a memory in the NILM system. An existing NILM system "learns" new devices through a supervised process, referred to as a training stage, where an operator activates and deactivates a new electrical device at predetermined times and the NILM system records the electrical characteristics of the new device. In some configurations, other devices that draw electrical current from the main electrical line should not change between an activated and deactivated state during the supervised learning process to prevent the NILM system from recording erroneous data during the supervised learning process. The supervised learning process increases the difficulty in using NILM systems and may be impractical in environments where one or more electrical devices activate and deactivate during the learning process. Thus, improvements to NILM systems that enable identification of individual electrical devices without a supervised learning process would be beneficial.

SUMMARY

In one embodiment, a method for identification of components of a time varying electrical power signal corresponding to a plurality of electrical devices that consume electrical power has been developed. The method includes identifying a plurality of electrical events corresponding to activation or deactivation of one of a predetermined number of electrical devices in a transformation of a time varying electrical power signal over a predetermined time period, the time varying electrical power signal supplying power to the predetermined number of electrical devices, deconvolving the identified plurality of electrical events in the transformation of the time varying electrical power signal to generate a first plurality of signatures, each signature in the first plurality of signatures corresponding to activation of one electrical device in the predetermined number of electrical devices, and to generate a second plurality of signatures, each signature in the second plurality of signatures corresponding to deactivation of one electrical device in the predetermined number of electrical devices, clustering the first plurality of signatures and second plurality of signatures to identify activations and deactivations of each electrical device in the predetermined number of electrical devices, and identifying one electrical device in the predetermined number of electrical devices corresponding to one signature in the first clustered plurality of signatures and one signature in the second clustered plurality of signatures.

In another embodiment, a system for monitoring electrical power consumption has been developed. The system includes an electrical power meter configured to measure a time varying electrical power signal that supplies power to a predetermined number of electrical devices, and a processor operatively connected to the electrical power meter and configured to store data generated by the electrical power meter corresponding to the time varying electrical power signal in a memory. The processor is further configured to generate a transformation of the time varying electrical power signal with reference to the data stored in the memory corresponding to the time varying electrical power signal over a predetermined time period, identify a plurality of electrical events corresponding to activation or deactivation of one of the predetermined number of electrical devices in the transformation of the time varying electrical power signal, deconvolve the identified plurality of electrical events in the transformation of the time varying electrical power signal to generate a first plurality of signatures, each signature in the first plurality of signatures corresponding to activation of one electrical device in the predetermined number of electrical devices, and to generate a second plurality of signatures, each signature in the second plurality of signatures corresponding to deactivation of one electrical device in the predetermined number of electrical devices, cluster the first plurality of signatures and second plurality of signatures to identify activations and deactivations of each electrical device in the predetermined number of electrical devices, and identify one electrical device in the predetermined number of electrical devices corresponding to one signature in the first clustered plurality of signatures and one signature in the second clustered plurality of signatures.

DETAILED DESCRIPTION

For the purposes of promoting an understanding of the principles of the embodiments described herein, reference is now being made to the drawings and descriptions in the following written specification. No limitation to the scope of the subject matter is intended by the references. The description also includes any alterations and modifications to the illustrated embodiments and includes further applications of the principles of the described embodiments as would normally occur to one skilled in the art to which this document pertains.

Figure 1:
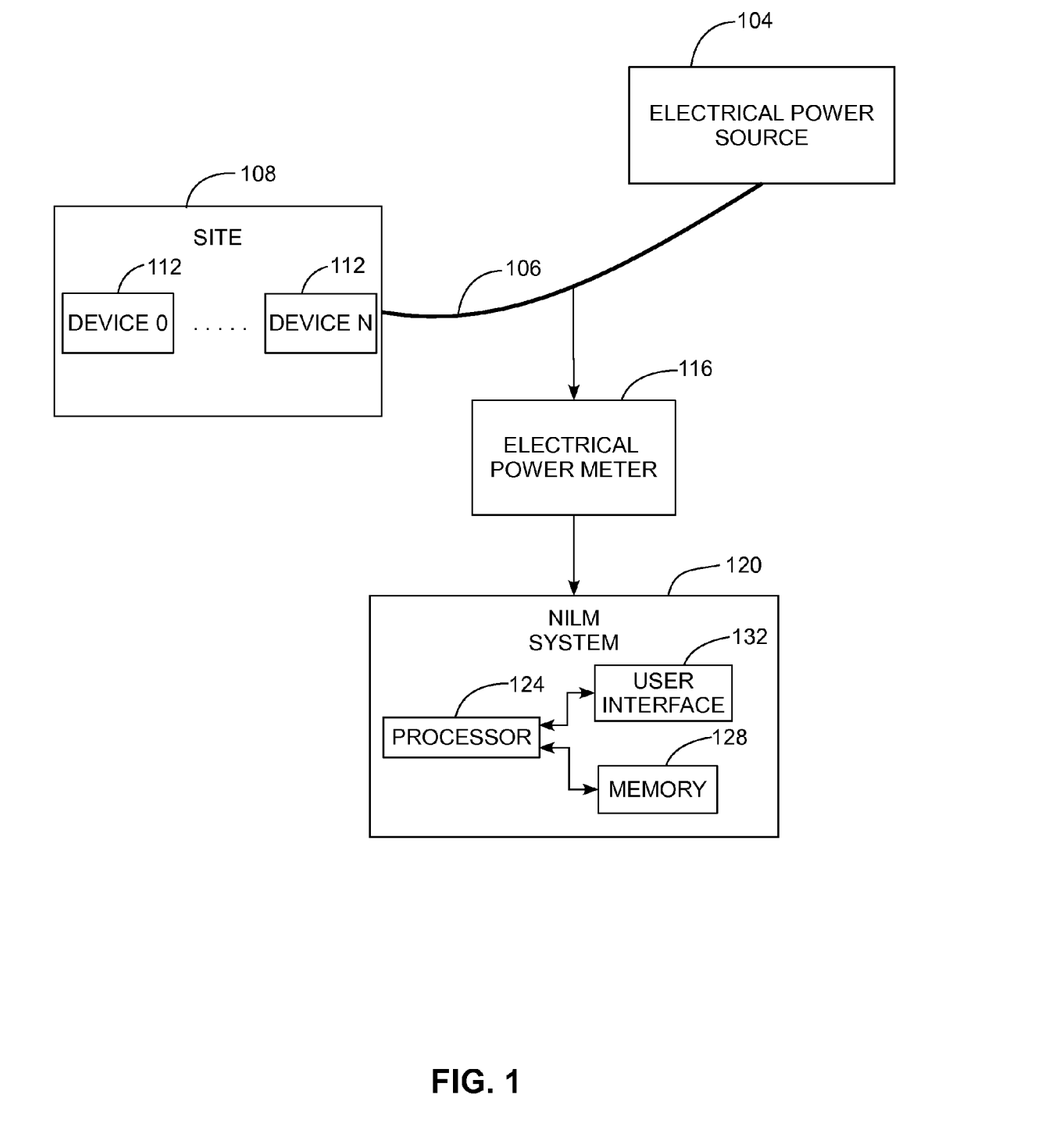
FIG. 1 is a diagram of a non-intrusive load monitoring system that measures electrical power delivered to multiple devices at a site.

FIG. 1 depicts an exemplary system for non-intrusive load monitoring (NILM) of the electrical power consumption of a site. In FIG. 1, an electrical power source 104 supplies electrical power to a site 108 through an electrical line 106. The electrical power source 104 includes any source of electrical power such as a commercial power grid or an electrical generator. In a common embodiment the electrical power source 104 provides an alternating current (AC) electrical power signal to the site 108 through the line 106. In another embodiment, the electrical power source 104 provides direct current (DC) power to the site 108. The site 108 is any location that includes multiple appliances or electrical devices 112 that each consume electrical power supplied by the single electrical line 106. Each electrical device places an electrical load on the electrical power supplied through the electrical line 106. In one example a site is a single building that houses various devices that consume electrical power, such as a residence, commercial building, or industrial facility. The magnitude of the electrical power signal delivered through the electrical line 106 varies as one or more of the devices 112 are activated and/or deactivated.

In FIG. 1, the electrical power supplied to the site 108 is monitored with an electrical power meter 116 and a NILM system 120. The electrical power meter 116 is operatively connected to the electrical line 106 externally to the site 108 to enable the electrical power meter 116 to measure the total electrical power delivered to the site 108. The electrical power meter 116 samples the magnitude of the electrical power signal in the electrical line 106 at regular intervals over time. In an exemplary embodiment where the electrical power is provided as a 60 Hz AC signal, the electrical power meter 116 samples the magnitude of electrical power at a given sampling frequency of 300 Hz. Electrical systems in Europe and other parts of the world operate with 50 Hz AC signals, and the selected sampling frequency can be adjusted to accommodate both DC signals and AC signals operating over a wide range of frequencies. In other embodiments, the electrical power meter samples the electrical power signal with a frequency of at least two times the highest expected frequency of changes in the magnitude of the electrical power signal due to activation or deactivation of one or more of the devices 112.

The NILM system 120 includes a processor 124, memory 128, and user interface 132. The NILM system 120 is operatively coupled to the electrical power meter 116 to receive data corresponding to the magnitude of the electrical power signal in the electrical line 106. In an AC power delivery system, the data typically include measurements of both real and reactive power that are delivered to the site 108. One or both of the electrical voltage and current are measured to identify the power delivered through the electrical line 106. The processor 124 is a microprocessor, microcontroller, or other digital computing device that performs stored instructions that are retrieved from the memory 128. The processor 124 receives data corresponding to the measured electrical power from the electrical power meter 116. During operation, the processor 124 generates output corresponding to the measured electrical power consumption of one or more of the devices 112 at the site 108 through the user interface 132. The user interface 132 includes various output devices, such as display screens, audio output devices, and network communication devices, which enable an operator to monitor the electrical power usage of the devices 112 at the site 108. The user interface 132 also includes input devices, such as keypads, touchscreen inputs, and network communication devices, which enable the operator to configure the NILM system 120 and send commands to the processor 124.

During operation, the NILM system generates information corresponding to the electrical power usage of individual devices 112 at the site 108. The NILM system 120 only receives aggregate power consumption data from the electrical power meter 116. The NILM system 120 identifies the activation, deactivation, and operating power of each of the different devices 112 on the site from changes in the total electrical power consumed by the site 108 over time. After the NILM system 120 is configured to monitor the particular set of devices 112 at the site 108, the memory 128 stores data corresponding to the changes in the waveform of the electrical power signal supplied to the site 108 when one of the devices 112 is either activated or deactivated. The NILM system 120 initiates operation with no a priori knowledge of the characteristics of the devices 112 in use at the site 108. An operator enters the number of devices 112 that are present at the site 108 through the user interface 132, and the NILM system 120 identifies signatures corresponding to each of the devices 112 through a recording and deconvolution process that is described below.

Figure 2:
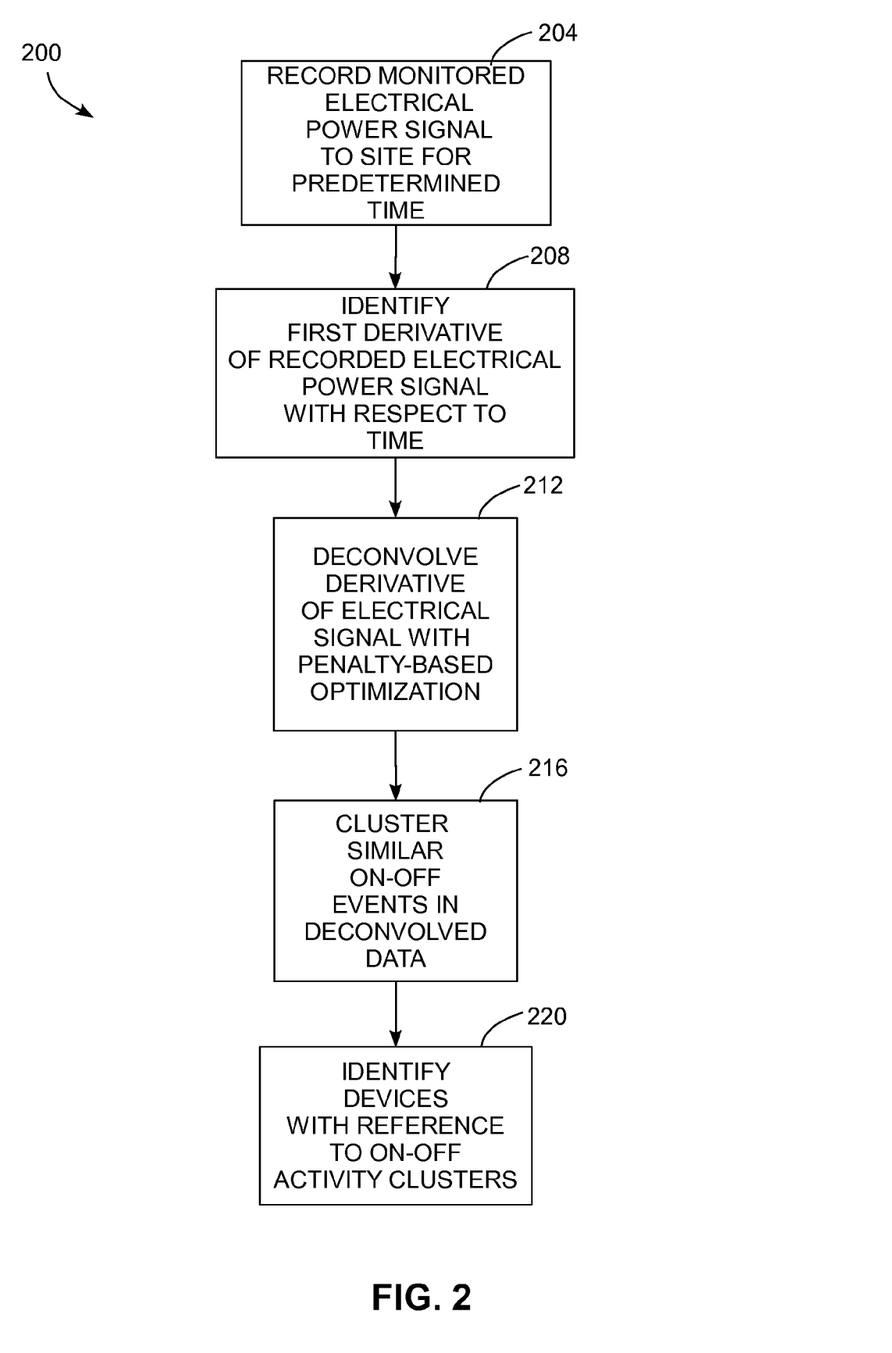
FIG. 2 is a block diagram of an unsupervised process for identifying individual devices that consume electrical power at a site using measurements of the total electrical power supplied to the site.

FIG. 2 depicts a process 200 for identifying signatures of multiple devices that consume electrical power at a site in an unsupervised manner. Process 200 is described with reference to FIG. 1 for illustrative purposes. In the NILM system 120, the processor 124 is configured to perform process 200 in conjunction with data from the electrical power meter 116 that are stored in the memory 128. Process 200 begins by monitoring the electrical power consumption supplied to a site for a predetermined time (block 204). For example, the electrical power meter 116 monitors the electrical power supplied to the devices 112 in the site 108 through the main line 106. The predetermined time is sufficiently long to enable the power meter 116 to record multiple activations and deactivations for each of the monitored devices 112 at the site 108. For example, the power meter 116 records the electrical power consumption of the devices 112 for a week to monitor the usage of devices that are activated and deactivated one or more times per day. The NILM system 120 stores the recorded signals in memory 128 to generate a profile of the total electrical power consumption of the site 108 during the predetermined time. The NILM system 120 can be communicatively coupled to a data network, such as the Internet (not shown), and various data including the profile of the total electrical power consumption of the site 108 are transmitted via the data network to a remote monitoring site such as a monitoring system operated by the electrical utility.

Figure 3A:
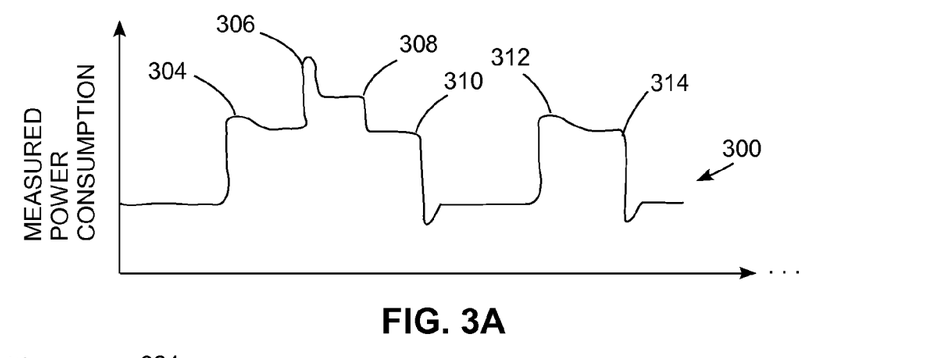
FIG. 3A is a diagram of the total electrical power consumption for a site including multiple devices over time.

FIG. 3A depicts an example of an electrical power signal 300 supplied through a main line to a site over time. In an embodiment where the main line carries AC power to the site, FIG. 3A depicts the root-mean-square (RMS) magnitude of both real and reactive power supplied to the site over time. At various times, one or more devices are activated and deactivated at that site, and the level of electrical power supplied to the site changes in response to the activation or deactivation of each device. In FIG. 3A, a first device $a_1$ activates at reference 304 and deactivates at reference 310. The first device $a_1$ activates for a second time at reference 312 and deactivates at reference 314. A second device $a_2$ activates at reference 306 and deactivates at reference 308 while the first device $a_1$ is already activated.

Referring again to FIG. 2, process 200 continues by identifying events in the electrical power signal that correspond to the activation or deactivation of the electrical devices. As used herein, the term "electrical event" refers to a change in the electrical power signal that occurs when one of the electrical devices 112 is either activated or deactivated. In general, a mathematical transformation of the recorded power signal facilitates the identification of electrical events in the electrical power signal. For example, the first derivative of the recorded electrical power signal with respect to time is used in the illustrative embodiment of FIG. 2 (block 208). The first derivative corresponds to the rate of change of the magnitude of the recorded electrical signal over time. In the NILM system 120 the processor 124 identifies the first derivative using a numerical technique, such as a finite difference or quadrature technique, which is applied to the recorded electrical power signal data that are stored in the memory 128.

In addition to identifying the electrical events using the first derivative of the electrical power signal, alternative embodiments perform higher-order transformations of the electrical power signal and the electrical events are identified in the transformed electrical signal. For example, the Teager energy operator uses both the first and second derivative to transform the electrical power signal using the following equation: $\Psi(x(t)) = x'(t) - x(t)x''(t)$ where $x(t)$ is the time varying magnitude of the electrical power signal. In the Teager energy operator expression, $x'(t)$ and $x''(t)$ are the first derivative and second derivative, respectively, of the electrical signal $x(t)$ with respect to time. Additional embodiments apply various transformations to the electrical power signal prior to identifying the electrical events in the transformed signal.

Figure 3B:
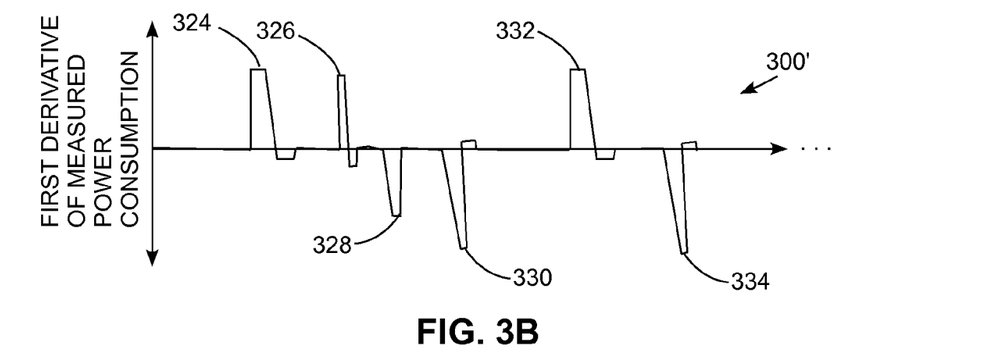
FIG. 3B is a diagram of the first derivative of the electrical power consumption depicted in FIG. 3A.

FIG. 3B depicts the first derivative 300' of the electrical power signal 300. In FIG. 3B, the activation of the first device $a_1$ has a signature depicted at references 324 and 332, and the deactivation of the first device $a_1$ has a signature depicted at references 330 and 334. The activation of the second device $a_2$ has a signature depicted at reference 326 and deactivation depicted at reference 328. As depicted in FIG. 3B, the signatures 324, 326, and 332 have a positive value indicating activation of one of the electrical devices, while signatures 328, 330, and 334 have negative values indicating deactivation of one of the electrical devices. Some signatures include measurable positive and negative waveform components due to ripple as the electrical power signal settles after activation or deactivation of the device. The average sign of the signature, positive or negative, is used to determine if a device is being activated or deactivated when both positive and negative components are present in the signature.

After identification of the electrical events, by means of a mathematical transformation, for example the first derivative of the recorded electrical signal, process 200 deconvolves the transformed signal, which is the first derivative of the recorded electrical signal in FIG. 2, into a plurality of signatures associated with either activation or deactivation of one of the devices 112 at different times (block 212). As used herein, the term "signature" refers to set of unique features of the signal in the time or frequency domain, like for example the amplitude and shape of the derivative of the measured electrical power signal during a time period when a device is either activated or deactivated. The deconvolution produces a plurality of signatures corresponding to either the activation or deactivation of one of the devices 112, and a corresponding set of impulse trains corresponding to the time when each activation or deactivation occurs. The deconvolution process only requires a priori knowledge of the number of devices that are activated and deactivated during the time of the recorded electrical signal, and does not require prior knowledge of the signature of each electrical device. In the NILM system 120, the operator enters the number of devices 112 at the site 108 that are activated and deactivated during the recording phase of process 200 through the user interface 132. The deconvolution process matches corresponding signatures of the same device through a penalty optimization process described in more detail below.

The penalty based deconvolution algorithm is provided with the following expression: $\min_{a_i^{On}, a_i^{Off}, n_i^{On}, n_i^{Off}} [\|y - \sum_{i=1}^{N} a_i^{On} * n_i^{On} - \sum_{i=1}^{N} a_i^{Off} * n_i^{Off}\|_2^2 + \sum_{i=1}^{N} \lambda_i J(a_i^{On}, n_i^{On}) + \sum_{i=1}^{N} \gamma_i J(a_i^{Off}, n_i^{Off})]$. The deconvolution identifies signatures of activation and deactivation of one of N electrical devices. The term y refers to the derivative of the recorded electrical signal over time or other transformation of the electrical power signal that identifies the activations and deactivations of the electrical devices. The terms $a_i^{\blacksquare}$ refer to a potential signature of either an activation $a_i^{On}$ or deactivation $a_i^{Off}$ of each one of N devices at the site, and the terms $n_i$ each refer to a set of one or more impulses that are convolved with a corresponding signature $a_i$. Each expression is a minimization function that selects signatures and impulses that produce a series of convolutions whose sum has a minimum difference from the observed derivative y of the recorded electrical power.

The terms $J(a_i^{On}, n_i^{On})$ and $J(a_i^{Off}, n_i^{Off})$ in expression are penalty functions. The penalty functions include constant terms $\lambda_i$ and $\gamma_i$ and a summation of all the impulses $n_i$ associated with the activation or deactivation of the device $a_i$. The deconvolution algorithm identifies a series of signatures $a_i$ and selected impulses $n_i$ that produce a minimum difference between the derivative of the signal y and the sum of the convolutions of each device signature $a_i$ and the associated impulses $n_i$. A larger penalization term increases the total value of the expression independently of the difference between the sum of the convolutions and the observed derivative of the electrical power signal, and the deconvolution algorithm minimizes the penalty term in addition to minimizing the difference between the sum of the convolutions and the observed derivative of the electrical power signal.

In one example, the penalty functions for activation and deactivation of the devices are chosen to be sparsity terms $J(a_i^{On}, n_i^{On}) = \|n_i^{On}\|_1^{-1}$ and $J(a_i^{Off}, n_i^{Off}) = \|n_i^{Off}\|_1^{-1}$ The sparsity penalty optimization term serves at least two purposes. First, the penalty optimization term includes a summation of the pulse train $n_i$ for each device. Consequently, a smaller number of pulses reduces the value of the penalty term. The penalty optimization term is referred to as a sparsity term since the penalty term has smaller values when fewer, or sparse, numbers of impulses are used in the convolution. Second, the penalty optimization term ensures that only impulse trains are convolved with the signatures for each device instead of other waveforms such as step functions and sinusoidal functions.

Figure 4A:
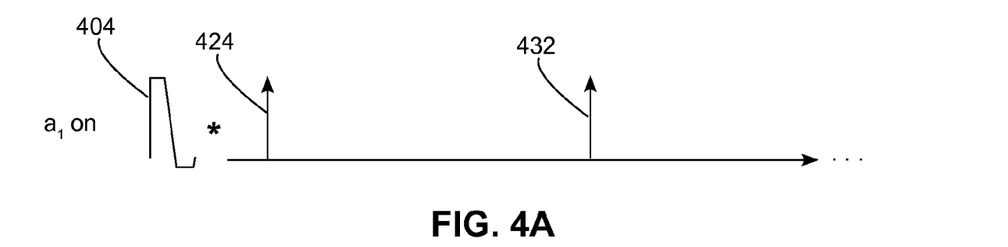
FIG. 4A is a diagram depicting a signature corresponding to the activation of a first device at a site convolved with impulses at times corresponding to when the first device was activated.
Figure 4B:
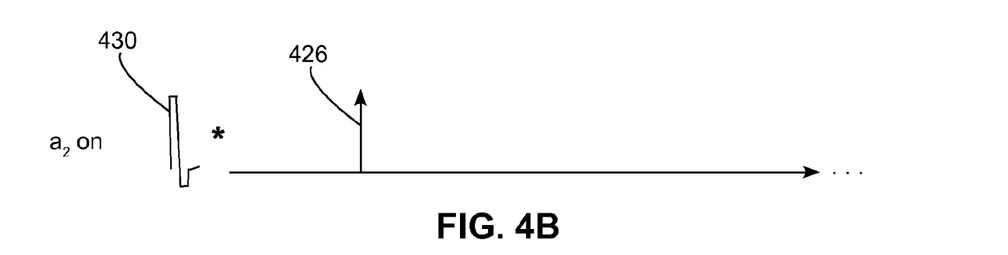
FIG. 4B is a diagram depicting a signature corresponding to the activation of a second device at the site convolved with impulses at times corresponding to when the second device was activated.
Figure 4C:
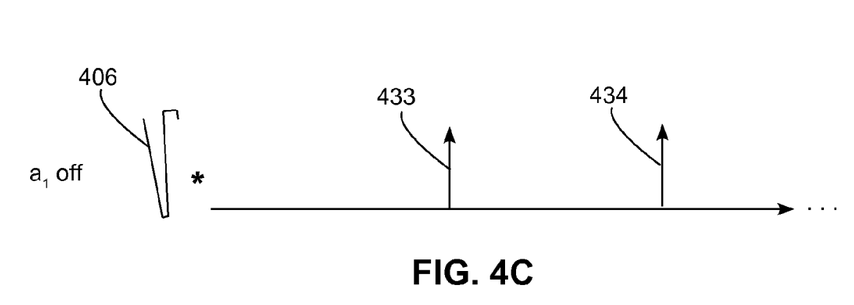
FIG. 4C is a diagram depicting a signature corresponding to the deactivation of the first device at the site convolved with impulses at times corresponding to when the first device was deactivated.
Figure 4D:
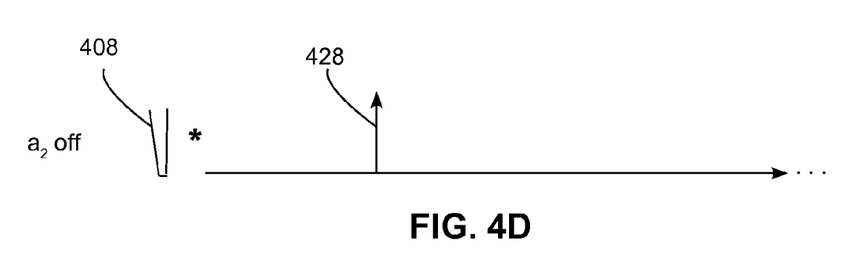
FIG. 4D is a diagram depicting a signature corresponding to the deactivation of the second device at the site convolved with impulses at times corresponding to when the second device was deactivated.

The deconvolution in process 200 separates FIG. 3B into a plurality of signatures corresponding to the activation or deactivation of one electrical device and impulses that correspond to the time at which the device is activated or deactivated. As described above, the deconvolved signatures with a positive average value correspond to activation of a device, and deconvolved signatures with a negative average value correspond to deactivation of a device. FIG. 4A and FIG. 4B depict convolutions of the activation signatures of devices $a_1$ and $a_2$, respectively. FIG. 4C and FIG. 4D depict convolutions of the deactivation signatures of devices $a_1$ and $a_2$, respectively. The sum of the convolutions depicted in FIG. 4A-4D corresponds to the derivative signal 300' depicted in FIG. 3B. FIG. 4A depicts a signature 404 and two impulses 424 and 432. A convolution between the signature 404 and impulses 424 and 432 produces a portion of the derivative 300' of FIG. 3B corresponding to activations of the device $a_1$. Similarly, FIG. 4B depicts a convolution of a signature 430 with an impulse 426 that produces the portion of the derivative 300' of FIG. 3B corresponding to the activation of the device $a_2$. FIG. 4C depicts a convolution between the signature 406 of the deactivation of the device $a_1$ and impulses 433 and 434 corresponding to the times at which the device $a_1$ is deactivated. FIG. 4D depicts convolution between the signature 408 of the deactivation of the device $a_2$ and impulse 428 corresponding to the time at which the device $a_2$ is deactivated.

The deconvolution process generates a series of N signatures associated with the on and off events of each of N devices and also generates impulses corresponding to the times at which each device is either activated or deactivated. After the deconvolution, process 200 generates clusters of similar on and off events identified in the deconvolution data (block 216). For example, if the activation of device $a_1$ depicted in FIG. 3A occurs daily within a certain range of times, the events are clustered together to improve the accuracy of identification of the device with reference to the time at which the device is operated as well as to the signature of the electrical power usage of the device. Another clustering method analyzes the activity of devices in the frequency domain to identify expected frequencies for how often each device is activated and deactivated. Various cluster analysis techniques including, for example, k-means clustering can be used to group the activations and deactivations of one or more devices together.

Process 200 continues by identifying individual devices with reference to the identified clusters of device signatures (block 220). In some embodiments, the assignment of devices is made automatically without human intervention. In an automatic assignment scenario, the exact identity of each device is not identified, although the activation, deactivation, and power consumption of the device are monitored using NILM. For example, in the example of FIG. 3 process 200 identifies that devices $a_1$ and $a_2$ are different devices having different power signatures and patterns of activation and deactivation over time. In an automatic procedure, process 200 assigns arbitrary identifiers to each device and continues to monitor the electrical power consumption of each device using the NILM system 120.

In another embodiment, process 200 presents information about the clustered signatures to a user. In the NILM system 120, the user interface 132 presents text or graphical data to an operator indicating when each identified device is activated and deactivated. The operator then assigns human readable identifiers to each device based on the predetermined usage patterns and approximate electrical power consumption characteristics of each device. For example, if device $a_1$ is a fan motor used in a ventilation system that is activated and deactivated daily while device $a_2$ corresponds to overhead lights that are activated for part of the day, then the operator assigns human readable names to each device such as "FAN MOTOR" and "OVERHEAD LIGHTS." The NILM system 120 associates future activations and deactivations of the identified devices with the assigned names, and the operator monitors the electrical power usage of multiple devices used at the site 108 from the NILM system 120.

The NILM system 120 and process 200 are configured to identify the signatures of individual devices 112 in the site 108 in an unsupervised manner. In particular, the NILM system 120 does not require input from the operator to associate each change in the measured electrical power signal with the activation or deactivation of a particular one of the devices 112. Process 200 only requires that the operator provide labels for individual devices after the electrical profiles corresponding to the activation and deactivation of each device have been identified. Thus, process 200 enables more efficient configuration of a NILM system with reduced burdens placed on the operator.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for monitoring electrical power consumption comprising:
   identifying a plurality of electrical events corresponding to activation or deactivation of one of a predetermined number of electrical devices in a transformation of a time varying electrical power signal over a predetermined time period, the time varying electrical power signal supplying power to the predetermined number of electrical devices;
   deconvolving the identified plurality of electrical events in the transformation of the time varying electrical power signal using a penalty optimization to generate a first plurality of signatures, each signature in the first plurality of signatures corresponding to activation of one electrical device in the predetermined number of electrical devices, and to generate a second plurality of signatures, each signature in the second plurality of signatures corresponding to deactivation of one electrical device in the predetermined number of electrical devices;

clustering the first plurality of signatures and second plurality of signatures to identify activations and deactivations of each electrical device in the predetermined number of electrical devices; and identifying one electrical device in the predetermined number of electrical devices corresponding to one signature in the first clustered plurality of signatures and one signature in the second clustered plurality of signatures.

2. The method of claim 1, the transformation of the time varying electrical signal being a first derivative of the time varying electrical power signal.

3. The method of claim 1 further comprising:
identifying a signature that is generated with the deconvolution is in the first plurality of signatures in response to the signature having a positive value.

4. The method of claim 1 further comprising:
identifying a signature that is generated with the deconvolution is in the second plurality of signatures in response to the signature having a negative value.

5. The method of claim 1, wherein the penalty optimization includes a sparsity penalty term.

6. The method of claim 1, wherein the clustering of the first plurality of signatures and the second plurality of signatures is made with respect to a plurality of times at which each electrical device in the predetermined number of electrical devices is activated and deactivated.

7. The method of claim 1, wherein the clustering of the first plurality of signatures and the second plurality of signatures is made with respect to a frequency at which each electrical device in the predetermined number of electrical devices is activated and deactivated.

8. A system for monitoring electrical power consumption comprising:
an electrical power meter configured to measure a time varying electrical power signal that supplies power to a predetermined number of electrical devices; and
a processor operatively connected to the electrical power meter and configured to store data generated by the electrical power meter corresponding to the time varying electrical power signal in a memory, the processor being further configured to:
generate a transformation of the time varying electrical power signal with reference to the data stored in the memory corresponding to the time varying electrical power signal over a predetermined time period;
identify a plurality of electrical events corresponding to activation or deactivation of one of the predetermined number of electrical devices in the transformation of the time varying electrical power signal;
deconvolve the identified plurality of electrical events in the transformation of the time varying electrical power signal using a penalty optimization to generate a first plurality of signatures, each signature in the first plurality of signatures corresponding to activation of one electrical device in the predetermined number of electrical devices, and to generate a second plurality of signatures, each signature in the second plurality of signatures corresponding to deactivation of one electrical device in the predetermined number of electrical devices;

cluster the first plurality of signatures and second plurality of signatures to identify activations and deactivations of each electrical device in the predetermined number of electrical devices; and identify one electrical device in the predetermined number of electrical devices corresponding to one signature in the first clustered plurality of signatures and one signature in the second clustered plurality of signatures.

9. The system of claim 8, the processor being further configured to:
generate the transformation of the time varying electrical power signal as a first derivative of the data stored in the memory corresponding to the time varying electrical power signal over the predetermined time period.

10. The system of claim 8, the processor being further configured to:
identify a signature that is generated with the deconvolution is in the first plurality of signatures in response to the signature having a positive value.

11. The system of claim 8, the processor being further configured to:
identify a signature that is generated with the deconvolution is in the second plurality of signatures in response to the signature having a negative value.

12. The system of claim 8, wherein the penalty optimization includes a sparsity penalty term.

13. The system of claim 8, wherein the processor clusters the first plurality of signatures and the second plurality of signatures with respect to a plurality of times at which each electrical device in the predetermined number of electrical devices is activated and deactivated.

14. The system of claim 8, wherein the processor clusters the first plurality of signatures and the second plurality of signatures with respect to a frequency at which each electrical device in the predetermined number of electrical devices is activated and deactivated.

15. The system of claim 8, wherein the time varying electrical power signal is an alternating current (AC) signal and the electrical power meter is further configured to measure a real component and a reactive component of the time varying electrical power signal.

16. The system of claim 15, wherein the processor is configured to generate the transformation of the data stored in the memory corresponding to the time varying electrical power signal with reference to a root mean square valuation of the real component and the reactive component of the time varying electrical power signal.

17. The system of claim 15, the processor being further configured to:
store the one signature in the first clustered plurality of signatures and the one signature in the second clustered plurality of signatures corresponding to the identified electrical device in the memory; and
identify at least one additional activation and deactivation of the identified electrical device that occurs after the predetermined time period with reference to the signatures stored in the memory.

* * * * *